Aug. 8, 1950     H. W. KINANDER     2,518,426
CONDUIT CONNECTING DEVICE
Filed March 29, 1946
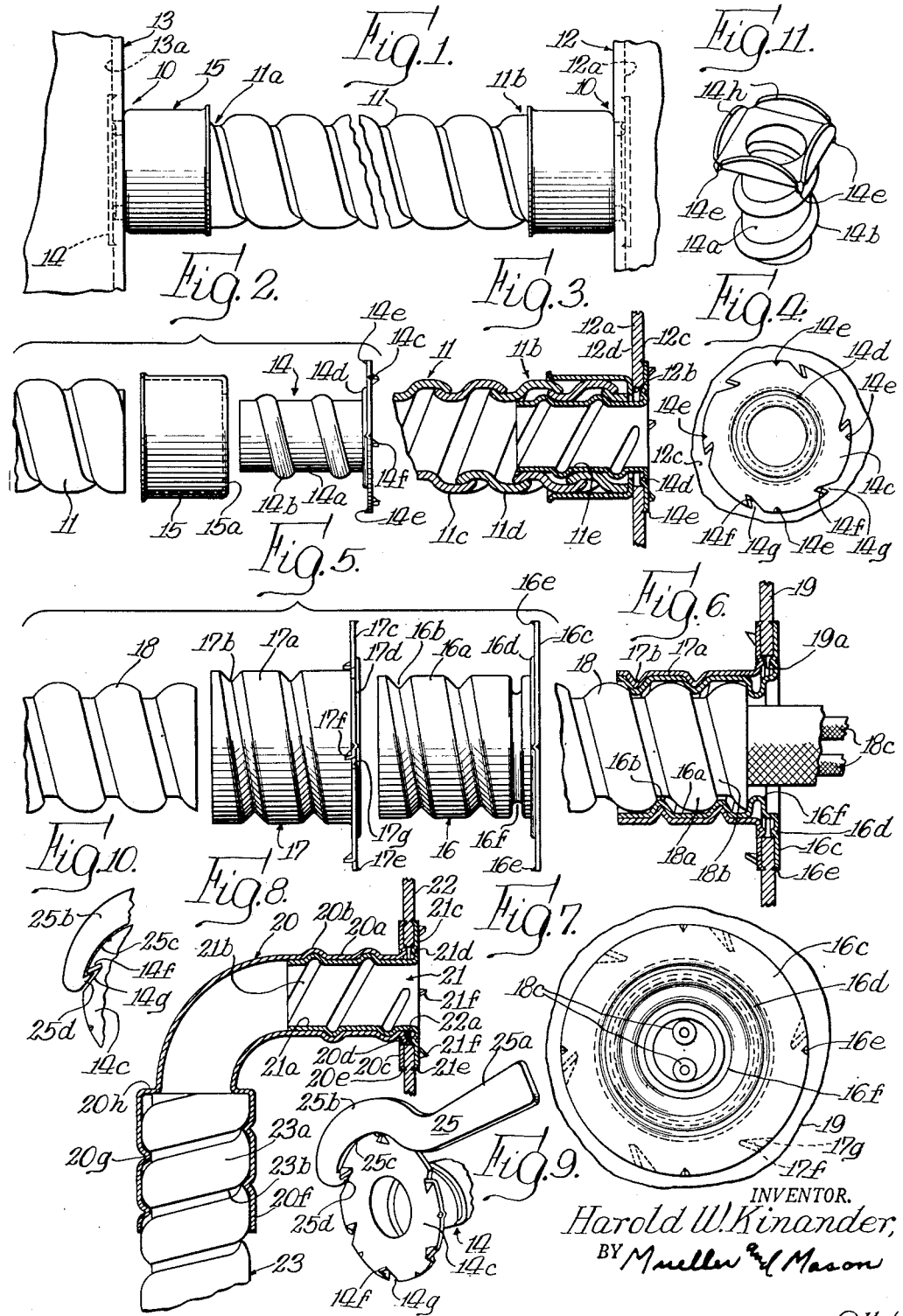
INVENTOR.
Harold W. Kinander,
BY Mueller & Mason
Atty's.

Patented Aug. 8, 1950

2,518,426

UNITED STATES PATENT OFFICE 2,518,426

CONDUIT CONNECTING DEVICE

Harold W. Kinander, Chicago, Ill., assignor to Simplet Electric Company, Chicago, Ill., a corporation of Illinois Application March 29, 1946, Serial No. 658,081

2 Claims. (Cl. 285—24.5)

1

The present invention relates to connectors and more particularly to improvements in connecting devices of the character utilized to connect the end of a conductor conduit to the wall of a conduit box or the equivalent.

Conductor conduit of the character mentioned as usually manufactured is of two types, i. e. BX cable in which two or more insulated conductors are housed within a protective metallic armor during manufacture, and Greenfield conduit which is substantially the same as BX cable without the conductors. Essentially, Greenfield conduit and the outer cover of BX cable are of the same construction in that each is comprised of spirally wound metal strips having their edges overlapped and interlocked to form a threaded tubular wall. The usual practice in connecting an end of cable of this type to the housing wall of a conduit box, for example, is to use an assembly comprised of a connector part having a threaded end insertable through an opening in the housing wall to receive a clamping nut at the inner side of the wall. Externally of the box, the connector part mounts facilities, usually consisting of a clamping bar and two bolts, for clampingly receiving the end of the conduit. Conventionally, an assembly of this character comprises at least five parts all of which must be separately manufactured and then assembled. Moreover, several of the parts require drilling and threading operations in the manufacture thereof. Further, and due to the relatively large number of parts making up an assembly of this type, it is a time consuming task to use the assembly in making a conduit connection at a conduit box. Hence, such assemblies are relatively expensive to manufacture and install.

It is an object of the present invention, therefore, to provide an improved connecting device of the character described which is relatively inexpensive to manufacture and install and yet provides a solid connection between a conduit end and the wall of a conduit box or the like.

It is another object of the invention to provide an improved two-part connecting device of the character described, the parts of which require a minimum of metal and may be formed entirely by die forming operations.

According to a further object of the invention, the parts of the present improved connecting device are arranged to take advantage of the threaded conduit structure in connecting an end of a conduit length to a wall.

In accordance with still another object of the invention, facilities are provided in the connector

2 parts for centering the cable end relative to an oversize conduit box opening of standard diameter and for preventing the two parts from becoming disassembled after they are assembled to provide a connection between a conduit end and a conduit box wall.

It is a still further object of the invention to provide a connecting device of the character described which may be employed to make an angled connection between a conduit end and a conduit box wall.

The invention, both as to its organization and method of use, together with further objects and advantages thereof, will best be understood by reference to the following specification taken in connection with the accompanying drawing, in which:

Fig. 1 is a fragmentary perspective view illustrating the use of two of the present improved connecting devices to connect the ends of a conductor conduit to spaced apart conduit boxes;

Fig. 2 is an explosion view illustrating in perspective the parts of one of the connecting devices shown in Fig. 1;

Fig. 3 is a sectional view of the connecting device shown in Fig. 2 illustrating the parts in fully assembled relationship;

Fig. 4 is an end view of the connecting device shown in Fig. 2;

Fig. 5 is an explosion view in perspective of a modified embodiment of the present improved connecting device;

Fig. 6 is a side view partially in section illustrating the parts of the connecting device shown in Fig. 5 in assembled relationship;

Fig. 7 is an end view of the connecting device shown in Fig. 5;

Fig. 8 is a side sectional view illustrating a further modification of the invention;

Fig. 9 is a view in perspective illustrating an implement used in assembling the parts of the connecting device;

Fig. 10 is a fragmentary side view further illustrating the mode of coaction of the parts shown in Fig. 9; and Fig. 11 is a perspective view illustrating a modification of one of the components of the connecting device shown in Figs. 1, 2, 3 and 4.

Referring now to the drawing and more particularly to Fig. 1 thereof, two of the present improved connecting devices generally indicated at 10 are there illustrated in their use to connect the ends 11a and 11b of a conductor conduit length 11 to the structural walls 12a and 13a of a pair of separated conduit boxes 12 and 13, respectively. In brief, and as best shown in Figs. 2, 3 and 4 of the drawing, each connecting device comprises a pair of tubular fastening elements 14 and 15, the first of which is provided with a tubular portion 14a insertable through an opening 12b in the wall 12a of the box 12, for example, and an outwardly directed flange 14c which is engageable with the wall 12a at the inner side 12c thereof. The second fastening element or connector part 15 is adapted to be telescoped over the end 11b of the cable length 11, for example, and is provided with an inwardly directed flange 15a for butting against the end edge of the conduit and the external side 12d of the wall 12a.

Conduit boxes of conventional construction are universally provided with knock out openings 12b of a standard diameter substantially larger than the internal diameter of the conductor conduit through which the conductors are led into the box. In order, therefore, centrally to position the tubular portion 14a of the connector part 14 within the opening 12b, the flange 14c is provided with means comprising an inwardly directed annular bead 14d for engaging the edges of the wall opening 12b during assembly of the two parts 14 and 15. For the additional purpose of preventing relative rotation between the wall 12a and the part 14 when the two parts 14 and 15 are assembled, the flange 14c is also provided with peripheral teeth 14e for biting into the wall 12a during assembly of the two connector parts.

As indicated above, conductor conduit of the type generally referred to in the trade as Greenfield conduit is sold strictly as a conductor armor and is adapted to have the insulated conductors threaded therethrough on each wiring job. The illustrated conduit length 11 is of this type and is comprised of a pair of metallic strips 11c and 11d which are spirally wound with their edges overlapped and interlocked in such manner that a spiral thread 11e is formed internally thereof. For the purpose of clamping the wall 12a between the flanges 14c and 15a of the two parts 14 and 15 without using auxiliary clamping facilities, the tubular portion 14a of the part 14 is provided with die formed threads 14b of the correct diameter and pitch for threadably engaging the thread 11e of the conduit 11. To assist in obtaining tight clamping engagement of the flanges 14c and 15a with the wall 12a, the flange 14c is also provided at its periphery with struck out lugs 14f defining peripheral notches 14g. These lugs and notches are arranged to cooperate with a clamping tool or implement 25 of the character shown in Fig. 9 of the drawings in drawing the flange 14c into tight clamping engagement with the wall 12c.

Briefly, the implement 25 comprises a handle part 25a, an arcuate portion 25b having an arcuate inner edge 25c of the same diameter as the periphery of the flange 14c and a nose 25d adapted for interlocking engagement with any one of the lugs 14f in the manner best shown in Fig. 10 of the drawing. By interlocking the nose 25d with a lug 14f, bringing the edge 25c to bear against an adjacent lug 14f and thrusting against the handle part 25a, the implement 25 may be used to facilitate threading of the connector part 14 into or out of the cable end 11b.

Alternatively, the flange construction shown in Fig. 11 of the drawings may be used to facilitate drawing the flanges 14c and 15a into clamping engagement with the wall 12a. As there shown, the peripheral edges of the flange 14c are bent outwardly by a die forming operation to provide ears 14h arranged in the form of a square and between which are located the inwardly directed teeth 14e. These ears may be engaged by a standard wrench in threading the tubular portion of the part 14 into the end of a conduit length.

In utilizing the described two part connecting device to connect the end 11b of the conduit length 11 to the wall 12a of the conduit box 12, for example, the tubular part 15 is first slipped over the end 11b of the conduit 11 until the inturned flange 15a thereof butts against the end of the conduit. Following this operation the conduit end is positioned over the wall opening 12b and the other connector part 14 is inserted through the wall opening and threaded into the conduit end to draw the two flanges 15a and 14c into clamping engagement with opposite sides of the wall 12a. During final movement of the tubular portion 14a of the part 14 into the conduit end (such final movement being accomplished through use of the tool 25 in the manner explained above), the bead 14d moves within the edge of the opening 12b to center the parts 14 and 15 and the conduit end relative to the opening 12b and also to prevent lateral displacement of the parts 14 and 15 relative to the wall 12a. As the flange 14c is screwed tight against the inner side 12c of the wall 12a, the teeth 14e bite into the surface of the wall to provide a locking connection which prevents the part 14 from becoming unscrewed.

Referring again to Fig. 1 of the drawing, the above described procedure may be followed in connecting the end 12b of the conduit length 11 to the wall 12a of the conduit box 12. In connecting the opposite end 11a of this conduit length to the wall 13a of the box 13, the connector part 15 is first inserted over the end of the conduit 11a and positioned opposite the opening in the wall 13a. Following this operation and before the companion connector part 15 is threaded into the conduit end 11a, a pair of pliers or another suitable implement may be used adjacent the end 11a to twist the conduit length 11 in a direction to unspiral the metallic strips thereof and thus stress these strips throughout their lengths in a direction to tighten the threaded engagement btween the connector part 14 at the opposite conduit end 11b and this conduit end. With the conduit length 11 thus held in a partially untwisted condition, the connector part 15 may be threaded into the conduit end 11a in the box 13 to the maximum extent possible. After this threading operation is completed, the plier grip on the conduit length 11 adjacent the end 11a thereof may be released permitting the conduit length to twist partially back to its normal setting, thereby to tighten the clamping engagement of the flange parts 14 and 15 with the wall 13a at the conduit end 11a. Normally, and if the extent of unwind is sufficient, the conduit length will not fully unwind to its normal untensioned condition and hence will act as a locking element to maintain clamping engagement of the parts 14 and 15 at each end of the conduit with the walls 12a and 13a.

Referring now more particularly to Figs. 5, 6 and 7 of the drawing, the modified embodiment of the invention there illustrated is comprised of two die formed metal stampings 16 and 17 and is particularly adapted for use in connecting an end of a conductor filled BX cable length to the wall of a conduit box, for example. Since the outer conduit of the cable is filled with conductors and insulation it is, of course, impossible to thread the tubular portion 16a of the part 16 into the end of the conduit. Accordingly, this portion of the part 16 is provided with threads 16b adapted for threaded engagement with the external thread 18b along the length of cable 18. Further, and to limit movement of the cable end 18a through the tubular portion 16a of the part 16, there is provided at the right end of this part as shown in Figs. 5 and 6 of the drawing, a bead 16b which extends radially inward and is adapted to butt against the cable end and thus arrest movement thereof through the tubular portion 16a of the part 16. Aside from the structural modifications just referred to and omission of the notches and lugs from the periphery of the flange 14c, the connector part 16 is identical in construction with the part 14 included in the embodiment of the invention shown in Figs. 1 to 4, inclusive. Thus, the part 16 is provided with an inwardly directed bead 16d along the flange 16c thereof having the function of centrally positioning this part and the cable end relative to the opening 19a in the conduit wall 19, and with teeth 16e around the periphery of the flange 16c which are adapted to bite into the wall 19 to prevent relative rotation between the wall and the connector part after a cable end connection is made with the wall 19.

The cooperating connector part 17 is also provided with a tubular portion 17a which is threaded as indicated at 17b to adapt the same for threadable engagement with the threads 16b of the part 16a. At the right end thereof, as viewed in Figs. 5 and 6 of the drawing, the part 16 is provided with an outwardly directed flange 17c engageable with the external side of the conduit wall 19. To assist in positioning the parts 16 and 17 centrally relative to the opening 19a in the wall 19, the flange 17c is also provided with an annular bead 17d directed toward the bead 16d and of the same diameter. At the periphery thereof the part 17 is provided with teeth 17e which are adapted to bite into the wall 19 at the external side thereof to prevent rotation of the part 17 relative to the cooperating connector part 16. Interposed between the teeth 17e at the periphery of the flange 17c are lugs 17f and notches 17g which are engageable by the tool 25 to produce clamping engagement of the two flanges 16c and 17c with the wall 19.

In general, the manner of using the described connecting device comprises the two parts 16 and 17 to effect a connection between the end 18a of the cable 18 and the wall 19 will be readily apparent from the above explanation. Briefly, however, the cable conductors 18c and the cable end are first inserted through the outer connector part 17, following which the cable conductors 18c are inserted through the wall opening 19a and then the inner connector part 16. The tubular portion 16a of the part 16 is now threaded onto the end 18a of the cable 18 until the bead 16f clampingly engages the end edge of the cable armor. Following this operation, the tubular portion 17a of the part 17 is threaded onto the tubular portion 16a of the part 16 to clamp the wall 19 between the flanges 16c and 17c. Incident to this operation, the oppositely directed beads 16d and 17d are brought into engagement with the edge of the opening 19a centrally to position the cable end 18a and the tubular portions of the tube parts relative to the wall opening 19a, and to force the teeth 16e and 17e into biting engagement with opposite sides of the wall 19, thereby to prevent relative rotation between the parts 16 and 17 and between these parts and the wall 19. Here again, the tool 25 is employed in cooperation with the tool lugs 17f of the flange 17c to force the flanges 16c and 17c into tight clamping engagement with the wall 19.

The third embodiment of the invention as illustrated in Fig. 8 of the drawing is also of two-part construction and is specifically adaptable for use in making an angle connection between the end 23a of a cable or conduit length 23 and the wall 22 of a conduit box, for example. The cable or conduit length 23 may be either of the BX or Greenfield type. More specifically considered, both parts 20 and 21 of the connector are formed of metal by die forming operations. The part 20 is of generally elbow configuration and is provided at one end with a tubular portion 20f of enlarged diameter having threads therein matingly engageable with the thread 23b of the cable or conduit end 23a. This portion of the part 20 is integrally connected with the other portions of the part by means of an inwardly directed shoulder 20h having the function of engaging the end edge of the cable or conduit armor to limit movement of the cable end into the part 20. At the opposite end thereof, the part 20 is provided with a tubular portion 20a terminating in an outwardly directed end flange 20c and threaded as indicated at 20b. This thread is matingly engageable with the thread 21b formed in the tubular portion 21a of the companion part 21 to draw the two flanges 20c and 21c into clamping engagement with the wall 22. As shown, the two flanges 20c and 21c are respectively provided with oppositely directed annular beads 20d and 21d for centrally positioning the tubular portions 20a and 21a relative to the wall opening 22a. They are also equipped with peripheral teeth 20e and 21e, respectively, for biting into the wall 22 at opposite sides thereof to prevent relative rotation of the two parts 20 and 21. Further, the flange 21c is provided adjacent the periphery thereof with tool lugs 21f adapted for engagement by the tool 25 to draw the flanges 20c and 21c into engagement with the wall 22.

In making a connection between the cable or conduit end 23 and the wall 22, the tubular portion 20f of the part 20 is first threaded onto the cable end to bring the shoulder 20h thereof into tight engagement with the cable end. Following this operation, the tubular portion 20a of the part 20 is centrally positioned relative to the wall opening 22a with the flange 20c in engagement with the wall 22 at the external side thereof and the tubular portion 21b of the part 21 is threaded into the tubular portion of the part 20 through the wall opening 22a. By using the tool 25 in cooperation with the lugs 21f provided at the periphery of the flange 21c, this flange and the flange 20c may be brought into tight clamping engagement with opposite sides of the wall 22 to bring the beads 21d and 20d within the opening 22a and to force the teeth 21e and 20e into biting engagement with the wall 22.

From the above explanation it will be understood that in each of the three illustrated embodiments of the invention only two fastening parts are required to make a rugged connection of pleasing appearance between the end of a threaded conduit and the wall of a conduit box or similar wire housing structure. Further, in each embodiment of the invention, each of the two parts may be easily and cheaply constructed by die forming operations with the use of a minimum of metal. Moreover, and due to the fact that only two parts are required, the assembly operation on a wiring job is greatly simplified and speeded up.

While there have been described what are at present considered to be the preferred embodiments of the invention, it will be understood that various modifications may be made therein which are within the true spirit and scope of the invention as defined in the appended claims.

I claim:

1. A device for connecting one end of a metallic conductor conduit comprised of interlocking spiral strips forming a threaded tubular wall to a structural wall having an opening therein comprising, a first sheet metal tubular element having an inturned end flange, said tubular element closely fitting the outside surface of said conduit with said inturned end flange abutting against the end of said conduit, and a second sheet metal tubular element having an outwardly extending end flange, said second tubular element having a threaded tubular portion of such diameter to be insertable through said opening in said structural wall and threaded into said conduit end to draw said flanges of said first and second tubular elements into clamping engagement with said structural wall, said first tubular element holding said interlocking spiral strips in position so that said conduit is securely held between said tubular elements.

2. A device in accordance with claim 1 in which said outwardly extending end flange of said second tubular element includes peripheral teeth for biting into said structural wall to prevent unintentional rotation of said second tubular element with respect to said structural wall.

HAROLD W. KINANDER.

REFERENCES CITED

The following references are of record in the file of this patent:

UNITED STATES PATENTS

| Number | Name | Date |
| --- | --- | --- |
| 451,973 | Ireland | May 12, 1891 |
| 913,265 | Coopage | Feb. 23, 1907 |
| 916,931 | McMurtrie | Mar. 30, 1909 |
| 1,116,498 | Schubert | Nov. 10, 1914 |
| 1,293,865 | Mueller | Feb. 11, 1919 |
| 1,775,128 | Hunter | Sept. 9, 1930 |
| 1,855,447 | Hagstedt | Apr. 26, 1932 |
| 2,038,290 | Hooley | Apr. 21, 1936 |